US008254827B2

(12) United States Patent
Wu

(10) Patent No.: US 8,254,827 B2
(45) Date of Patent: Aug. 28, 2012

(54) METHOD OF MULTICASTING

(75) Inventor: Zhenyu Wu, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 215 days.

(21) Appl. No.: 12/734,364

(22) PCT Filed: May 28, 2008

(86) PCT No.: PCT/US2008/006741
§ 371 (c)(1),
(2), (4) Date: Apr. 27, 2010

(87) PCT Pub. No.: WO2009/058165
PCT Pub. Date: May 7, 2009

(65) Prior Publication Data
US 2010/0240300 A1     Sep. 23, 2010

Related U.S. Application Data

(60) Provisional application No. 61/001,464, filed on Nov. 1, 2007.

(51) Int. Cl.
*H04H 20/74* (2008.01)
(52) U.S. Cl. .................................. 455/3.01; 455/452.1
(58) Field of Classification Search ............... 455/3.01, 455/452.1; 370/229, 432
See application file for complete search history.

(56) References Cited

U.S. PATENT DOCUMENTS
2007/0115813 A1 *  5/2007  Hyon et al. ................. 370/229

FOREIGN PATENT DOCUMENTS
WO   WO0209429 A2   1/2002
WO   WO0235844 A2   5/2002

OTHER PUBLICATIONS

Mark Felegyhazi et al., "Game Theory in Wireless Networks: A Tutorial", EPFL Technical report: LCA-Report-2006-002 [online] Jun. 28, 2006, pp. 1-14.
Andrea Gallice, "Predicting One Shot Play in 2x2 Games Using Beliefs Based on Minimax Regret", ETA—Economic Theory and Applications, [Retrieve on Jul. 29, 2008] Retrieved from the Internet, Feb. 2006, pp. 1-32.

(Continued)

*Primary Examiner* — Tu X Nguyen
(74) *Attorney, Agent, or Firm* — Robert D. Shedd; Harvey D. Fried; Richard LaPeruta

(57) ABSTRACT

A method for multicasting data includes obtaining a set of minimum utility preferences and a utility preference for each user in a multicast group, computing a corresponding probability distribution of different multicasting data the users are requesting, running a lottery of operating points of the set according to the corresponding probability distribution, and multicasting the operating point determined from the lottery. For scalable layered data the method includes determining initial utility and payoff parameter for each user for a lowest data layer accommodating all group users, running a lottery for the layer using an initialized probability vector to assign the lowest layer, multicasting the lowest layer, determining new initial utility and corresponding payoff parameter for each remaining group user for a plurality of layers of data, running another lottery according to a determined mixed set probability vector to select a particular layer, and multicasting the particular layer.

7 Claims, 2 Drawing Sheets

OTHER PUBLICATIONS

Zhnengye Liu et al., "An Adaptive Joint Source and Channel Coding Scheme for H.264 Video Multicasting Over Wireless LAN", Proceeding IEEE Packet Video, Hangzhou, China Apr. 2006, pp. 1-10.

Abhik Majumdar et al., "Multicast and Unicast Real-Time Video Streaming Over Sireless LANs", IEEE Transactions on Circuits and Systems for Video Technology, vol. 12, No. 6, Jun. 2002, pp. 524-534.

Hyunggon Park et al., "Multi-User Multimedia Resource Management Using Nash Bargaining Solution", IEEE International on Acoustics, Speech and Signal Processing, 2007, ICASSP, vol. 1, Apr. 15, 2007, pp. II-717-II-720.

Leiming Qian et al., "Minimax Disappointment Criterion for Video Broadcasting", IEEE International Conference on Image Processing, vol. 1, Oct. 7, 2001, pp. 449-452.

International Search Report, dated Aug. 4, 2008.

* cited by examiner

METHOD OF MULTICASTING

CROSS-REFERENCE TO RELATED APPLICATIONS

This application claims the benefit, under 35 U.S.C. §365 of International Application PCT/US2008/006741, filed May 28, 2008 and which claims priority to U.S. Provisional Patent Application Ser. No. 61/001,464 entitled "METHOD OF MULTICASTING," filed on Nov. 1, 2007, which is hereby incorporated by reference in its entirety.

FIELD OF THE INVENTION

The invention relates to a method of multicasting to a plurality of users wherein at least one user has a different channel condition than another user.

BACKGROUND OF THE INVENTION

With the rapid development of wireless network infrastructure, the demand for video services over these networks has been steadily growing. Among various services, video streaming has become one of the most important applications. However, in a wireless environment, efficiently streaming a coded video bit stream to a large number of users and simultaneously guaranteeing a certain quality of service (QoS) remains a challenge.

Video multicast is an efficient way to deliver one video simultaneously to many users over networks. In contrast to unicasting, video multicast improves bandwidth efficiency by sharing video packets delivered through networks. However, video multicast faces some particular problems arising from wireless network applications. For example, a multicasting wireless network is often characterized by having a physical channel that is highly error-prone and time varying. In addition, users in such a network can often have diverse channel conditions.

Retransmission and forward error correction (FEC) are the two commonly used mechanisms to improve the throughput of a wireless network. However, there are drawbacks when applying them straightforwardly in the multicast scenario. For example, retransmission is inefficient to all but one user when repeatedly multicasting of an original packet for the benefit of a single user who is error-prone. In fact, 802.11 wireless local area networks (WLANs) do not support link layer retransmission for multicast applications. Meanwhile, FEC can maintain a constant throughput and bounded delay. However, to guarantee certain QoS, FEC codes are often chosen for the worst channel conditions. This can unnecessarily penalize the throughput when the channel is in a good state.

The hybrid Automatic Repeat-reQuest (ARQ) scheme proposed by Majumdar, D. Sachs, I. Kozintsev, K. Ramchandran and M. Yeung (in "Multicast and unicast real-time video streaming over wireless LANs", IEEE Trans. Circuits & System for Video Technol., Vol. 12, No. 6, June 2002, pp. 524-534) combines the benefits from both retransmission and FEC. With hybrid-ARQ, the server first sends user data and then FEC data to the client. During the process, when the client has received all the user data or enough FEC data to recover losses, the client sends an acknowledgement (ACK) back to the server. Once the server receives ACK, it stops sending more data. Since the amount of FEC data sent to the client can be adjusted properly according to current channel condition, hybrid-ARQ is able to maintain high bandwidth efficiency. However, when the channel undergoes severe losses, hybrid-ARQ can result in unbounded delay and bandwidth expansion. For real-time services such as video streaming, video packets have to be delivered before their playback deadlines through a potentially bandwidth-limited network. So for such applications, video data losses can still occur with hybrid-ARQ, which degrades QoS.

In the environment of video streaming to a multicast group over a wireless network with feedback, it is contemplated in this invention that the users in the group will have different channel conditions and, as such, delivery of the same video stream to the entire group may not be equally efficacious to each member of the group. Therefore, in such a contemplated multicast group, it is believed that a need exists to develop an operating point strategy, which is "fair and reasonable" to all the users.

The premise of the invention is that a good operating point should provide good overall system performance, while maintaining reasonable performance for each user in the group. However, because of the possibly diverse channel conditions in multicast networks, the above two requirements can often be contradictory. This makes it difficult to directly quantify the performance of an operating point. As such, a set of intuitive factors for an "ideal" operating point selection strategy will be briefly discussed.

The first intuitive factor is the majority rule. This factor is based on the premise that if the majority of the users have the same or similar channel conditions, then these users should be more likely to get their desired operating points than of the rest users. This guarantees a reasonably good overall system performance.

The second intuitive factor is individual fairness. This factor provides that no individual user should be completely denied service nor should one be overly penalized. The QoS degradation due to a selected operating point should be (preferably equally) shared by all the users.

The third intuitive factor is flexibility. This factor is essentially a recognition of the fact that the first two factors can be conflicting and one factor can be preferred over the other. Here, strategy should be flexible to implement such a preference.

In light of the potential conflicts between the intuitive factors, it would appear that some quantitative system performance metrics can be helpful in characterizing the operating points in a particular multicast environment. In the following, a list of some methods will now be presented, along with an analysis of how they influence intuitive factors summarized above. Suppose a multicast group has N users, and the server can choose M different operating points with each operating point denoted as $S_m$ (where $1 \leq m \leq M$). For each user j ($1 \leq j \leq N$), when an operating point $S_m$ is selected, its corresponding performance measure will be noted as $U_{j,m}$.

The worst-case method selects an operating point according to the users in the group who have the worst channel condition. In other words, the selected operating point is only optimal for those users with the worst channel condition, regardless of the number of users in the group with other channel conditions. This can overly penalize a subgroup of users with better channel condition and can decrease the collective system performance. It does not provide any flexibility in adjusting between the first and second intuitive factors.

The average performance method defines a metric based on the average performance of all the users in the group. Here, the operating point is derived by optimizing the metric:

$$m^* = \arg\left(\text{Max} \sum_{j=1}^{N} U_{j,m}\right) \quad 1 \le m \le M$$

This method satisfies the first factor, but fails the second factor, because some users in the group can be overly penalized. The method does not seemingly provide flexibility in adjusting between the first and second factors.

The weighted average method defines the metric as the weighted average performance of the users in the group, and the operating point is derived by optimizing the metric:

$$m^* = \arg\left(\text{Max} \sum_{j=1}^{N} W_j U_{j,m}\right)$$

where $$\sum_{j=1}^{N} W_j = 1 \text{ and } 1 \le m \le M$$

The weight $W_j$ reflects the importance of user j in the overall system. An example for the weights can be:

$$W_j = \begin{cases} 1/N_g & P_j \le P_{th} \\ 0 & P_j > P_{th} \end{cases}$$

where $P_j$ is the channel error/loss rate experienced by user j, $P_{th}$ is a preset threshold and $N_g$ is the number of users in the group having $P_j$ being less than $P_{th}$. This weighting approach only averages over the users with reasonably good channel conditions while excluding those with bad channel conditions. This method can provide good performance for a selected subgroup of users. However, it can also overly penalize certain users in the group; thus failing the second factor. Further, this method cannot provide flexibility in adjusting between the first and second factors.

The minimax degradation method selects an operating point $S_m$, which can minimize the maximum performance degradation among all the users:

$$M^* = \arg\left\{\text{Min}\left[\text{Max} \sum_{j=1}^{N} (U_j^* - U_{j,m})\right]\right\} \quad 1 \le m \le M$$

where $U^*_j$ is the optimal performance achievable by user j among all the available operating points. This method cannot give preference to the majority users in the group and thus can compromise overall system performance, which fails on the first factor. As such, this method cannot provide flexibility in adjusting the first and second factors.

SUMMARY OF THE INVENTION

A method for multicasting data comprises obtaining a set of minimum utility preferences for each user in a multicast group; obtaining a utility preferences for each user in a multicast group; computing a corresponding probability distribution of different multicasting data that the users are requesting; running a lottery of the set of the preference operating points according to the corresponding probability distribution; and multicasting the operating point determined from the lottery. For scalable layered data the method comprises: determining initial utility and payoff parameter for each user in a group for a lowest layer of data that accommodates all users; initializing a probability vector as (1, . . . , 0); running a lottery for the layer using the probability vector to assign the lowest layer; multicasting the lowest layer; determining new initial utility and corresponding payoff parameter for each remaining user in the group for a plurality of layers of data when there is confirmation at least one user in the group has received the lowest layer; determining a mixed set probability vector for the plurality of layers of data; running another lottery according to the mixed set probability vector to select a particular layer from the plurality; and multicasting the particular layer.

DETAILED DESCRIPTION OF THE INVENTION

Figure 1:
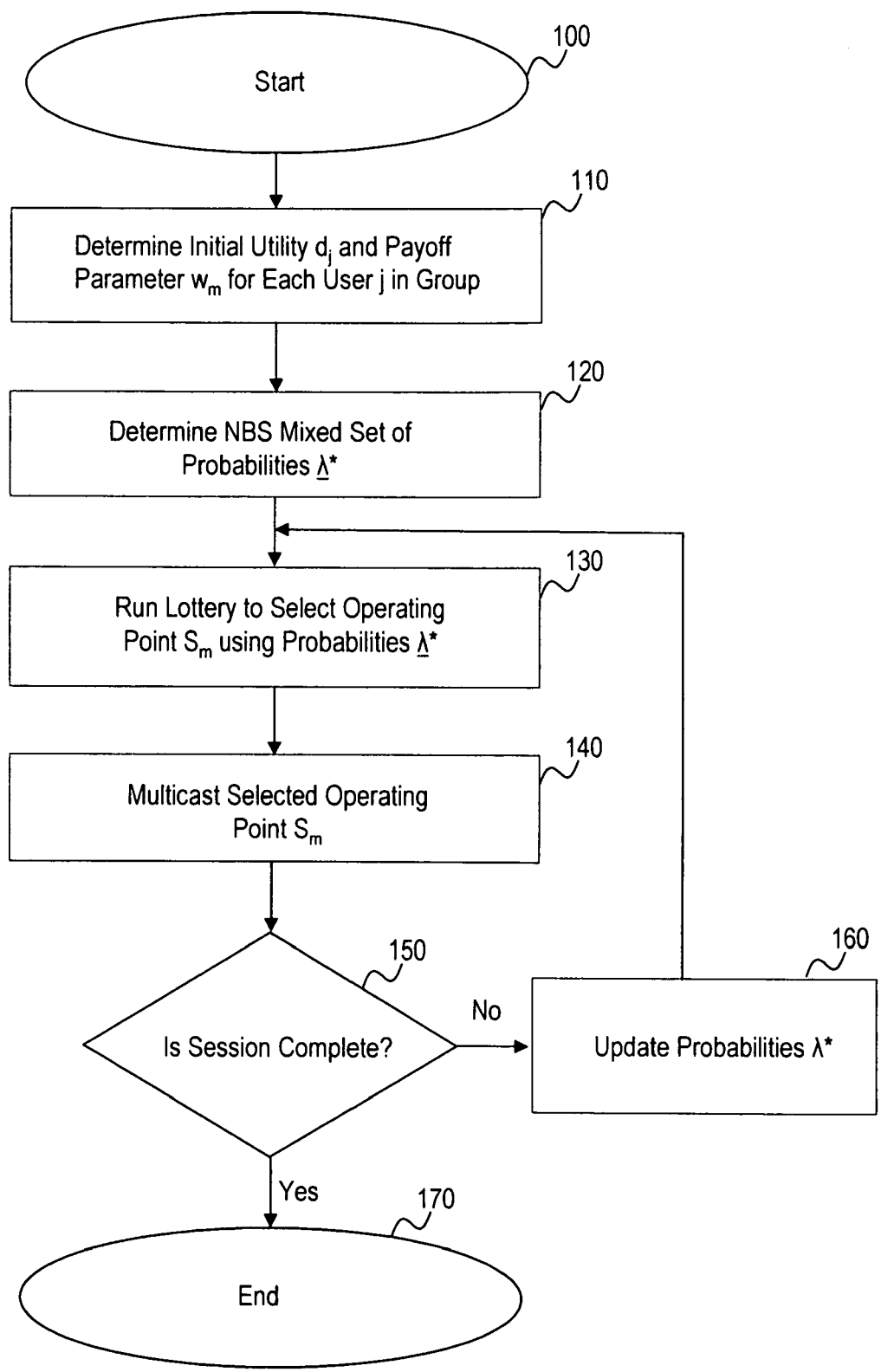
FIG. 1 is a flow chart of selecting an operating point to multicast according to the invention.

The invention provides a method of selecting an operating point in a multicasting network within a noisy/lossy environment. The formalism uses a Game Theory strategy (i.e. Nash bargaining game). Each available operating point $S_m$ is defined as a pure strategy and the number of such operating points is denoted as M. Due to the discrete nature of the strategies, a simple but fair way for a server or a functional equivalent to choose an operating point is to run a lottery within a set S of possible strategies, where $S=(S_1, S_2, \ldots, S_M)$. Next, the server surveys the population of users to determine $u_{j,m}$, which is the utility function for each user j for a particular operating $S_m$. The approach then can include the calculation of the corresponding probability distribution vector $\lambda=(\lambda_1, \lambda_2, \ldots \lambda_M)$. This corresponds to the "mixed strategies" in the Nash bargaining game and the approach denotes each mixed strategy as probability distribution vector $\lambda$ for simplicity. For mixed strategy, it is the set of probabilities $\lambda^*$ that users agree on, can agree on or can be predetermined by the server. First, the mixed strategy is Nash Bargaining Solution (NBS) if and only if it satisfies the condition of the arithmetic product of the differences of the fair payoffs ($U_j(\lambda^*)$) and the initial utilities $d_j$ is greater than or equal to the arithmetic product of the differences of payoffs ($U_j(\lambda)$) and the initial utilities $d_j$.

The user preference is then determined and is characterized as utility function $U_{j,m}$ for user j, which reflects the payoff when operating point $S_m$ is selected. It should be related to the user quality of service (QoS). For a mixed strategy distribution vector $\lambda$, user j is concerned about her expected payoff which can be written as $$U_j(\lambda) = \sum_{m=1}^{M} \lambda_m u_{j,m}$$

and the utility for the entire group for a mixed strategy A is denoted as $$\underline{U}(\underline{\lambda}) = (U_1(\underline{\lambda}), U_2(\underline{\lambda}), \ldots, U_m(\underline{\lambda})).$$

The initial utility for user j is then determined. The initial utility $d_j$ reflects the minimum payoff (or equivalently its QoS) that the user wants to be guaranteed when participating in the game.

The game has a unique solution, which is NBS. In the mixed strategy case, it is a probability distribution vector $\underline{\lambda}^*$ that users agree on terms of fairness and is used in the lottery. A mixed strategy distribution vector $\underline{\lambda}^*$ is NBS if and only if it satisfies the condition for all feasible $\underline{\lambda}$:

$$\prod_{j=1}^{N} (U_j(\underline{\lambda}^*) - d_j) \geq \prod_{j=1}^{N} (U_j(\underline{\lambda}) - d_j)$$

The multicasting server can find the NBS probabilities distribution vector $\underline{\lambda}^*$ by solving the following optimization problem:

$$\max \prod_{j=1}^{N} \left( \sum_{m=1}^{M} \lambda_m u_{j,m} - d_j \right)$$

such that $$\sum_{j=1}^{N} \lambda_m = 1$$

and $$\sum_{j=1}^{N} \lambda_m u_{j,m} \geq d_j$$

for any user j ($1 \leq j \leq N$).

Consider a multicast session that is divided into multiple subsessions during which the server can change the operating point each time. At the beginning of each subsession, the server first checks whether there is any change in the user group. Such changes include N, M, the set of $\{S_m\}$ or the set of $\{(u_{j,m}, d_j)\}$. If so, the server recalculates $$\max \prod_{j=1}^{N} \left( \sum_{m=1}^{M} \lambda_m u_{j,m} - d_j \right)$$

to obtain an updated NBS vector $\underline{\lambda}^*$; otherwise, the server continues to use the previous NBS vector $\underline{\lambda}^*$. Based on the probability distribution vector $\underline{\lambda}^*$ the server randomly chooses an operating point $S_m$ in accordance with $\underline{\lambda}^*$ and uses it to multicast throughout the subsession.

FIG. 1 shows a general flow chart of a feature of the invention. The setting is a multicast environment where a server or a functional equivalent transmits simultaneously the same data to different users who can have different channel conditions or different data error/loss conditions. The invention first begins with starting Block 100 which involves providing useful data to transmit. Block 110 involves determining the initial utility $d_j$ and payoff parameter $w_m$ for each user j in the group by surveying the users in the group. Block 120 involves determining NBS mixed set of probabilities $\underline{\lambda}^*$ by finding $$\max \prod_{j=1}^{N} \left( \sum_{m=1}^{M} \lambda_m u_{j,m} - d_j \right)$$

when $$\sum_{j=1}^{M} \lambda_m = 1.$$

Block 130 is the running of the lottery of the available operating points within the set S of possible strategies. Here the operating point is randomly selected based on weight given to the operating points from the NBS mixed set probability distribution $\underline{\lambda}^*$. Block 140 then involves multicasting of the winning operating point $S_m$. This winning operating point can be bit stream data. Block 160 is the step that determines if the session is complete, wherein the server or functional equivalent verifies that users have received all useable data commensurate with the multicasting of the winning operating point. This can be in the form of acknowledgement. If users are satisfied, the session is finished which is reflected by Block 170. If any users have a status that has changed or needs different operating points, Block 160 provides an update of the probability distribution $\underline{\lambda}^*$ for the strategies. Block 130 is then rerun to select a winning operating point. Blocks 130, 140, 150 and 160 can run repeatedly until all users have acknowledged satisfaction of the multicast.

a. Multicasting Scalable Layered Data

Scalable layered data refer to the data that are organized into multiple layers such that the lower layer data are more important than the higher layer data. This type of data can often be found from the output of a scalable audio, video or image coder. For example, scalable video coding (SVC) [5] for video coding, JPEG2000 for image coding and AAC for audio coding (per ISO/IEC 14496-10: 2005/FDAM 3 Scalable Video Coding (WG 11 N9197)).

Consider the scalable layered user data are divided into multiple data packets and each time the multicast server selects one data packet from a layer to transmit. To protect the user data, redundancy data (such as FEC) are added, which can be along each layer or across all the layers. These redundancy data are also divided into packets to send. For the scalable layered data with M layers, the server can multicast a data packet from any of the layers. So the size of the mixed strategy set is M and each pure strategy $s_m$ corresponds to choosing a packet from layer m to multicast. The approach defines the utility function $u_{j,m}$ for user j when the pure strategy $s_m$ selected has the following: $u_{j,m} = w_m$, when user j requesting a layer m packet or otherwise, $u_{j,m} = 0$, (where $w_m \in R^+$). The payoff parameter $w_m$ is defined such that it is directly related to the QoS improvement. For example, for scalable video coding (SVC), it can be defined as the MSE (mean squared error) reduction when the user requests a packet from layer m. For scalable layered data, the payoff parameters are defined such that $w_i \geq w_j$ (where $0 \leq i < j$). It ensures that the server will give preferences to multicasting user data from lower layers for good overall system performance. For scalable layered data, the initial utility $d_j$ for user j is defined such that it decreases as the user requests packets from a higher layer. Specifically, the approach defines $d_j$ for user j requesting a packet from layer m as the following to reflect the constraint:

$$d_j = w_m / \alpha^m, \text{ where } \alpha \in R \text{ and } \alpha \geq 1.$$

With the above definition, α serves as the parameter to adjust the preferences between the first and second intuitive factors (i.e., majority rule for reasonably good overall system performance and individual fairness for insuring that no individual user should be completely denied service nor should one be overly penalized, respectively).

For a small α value, more preference is given to the users who are requesting lower layers. This guarantees good overall performance since the lower layer data are more important than the higher layer data. On the other hand, for a large α value, all the users are treated more equally so that the majority of users are favored from the perspective that all strategies and hence all users are treated more equally. Therefore, the factors (1) and (2) can be flexibly adjusted.

In summary, the server performs the operating point selection for scalable layered data multicasting as follows:

Step 1. Initialize vector $\underline{\lambda}^*$ as $(1, \ldots, 0)$ to multicast the lowest layer to all the users in the group.

Step 2. If the user condition changes and/or acknowledgement arrives, go to Step 3; otherwise go to Step 5.

Step 4. Trace acknowledgement sender user j. Record its requesting layer, and update its $u_{j,m}$, and $d_j$ based on $d_j = w_m/\alpha^m$, where $\alpha \in R$ and $\alpha \geq 1$ and $u_{j,m} = w_m$, when user j requesting a layer m packet or otherwise, $u_{j,m} = 0$.

Step 5. Update vector $\underline{\lambda}^*$ by solving $$\max \prod_{j=1}^{N} \left( \sum_{m=1}^{M} \lambda_m u_{j,m} - d_j \right)$$

such that $$\sum_{j=1}^{M} \lambda_m = 1$$

and $$\sum_{j=1}^{N} \lambda_m u_{j,m} \geq d_j \ (1 \leq j \leq N)$$

Step 6. Pick a winning strategy $S_m$, randomly according to vector $\underline{\lambda}^*$ and multicast a packet from layer m.

Step 7. If acknowledgement or changes in user conditions occur, go to Step 3; otherwise the session is completed.

Figure 2:
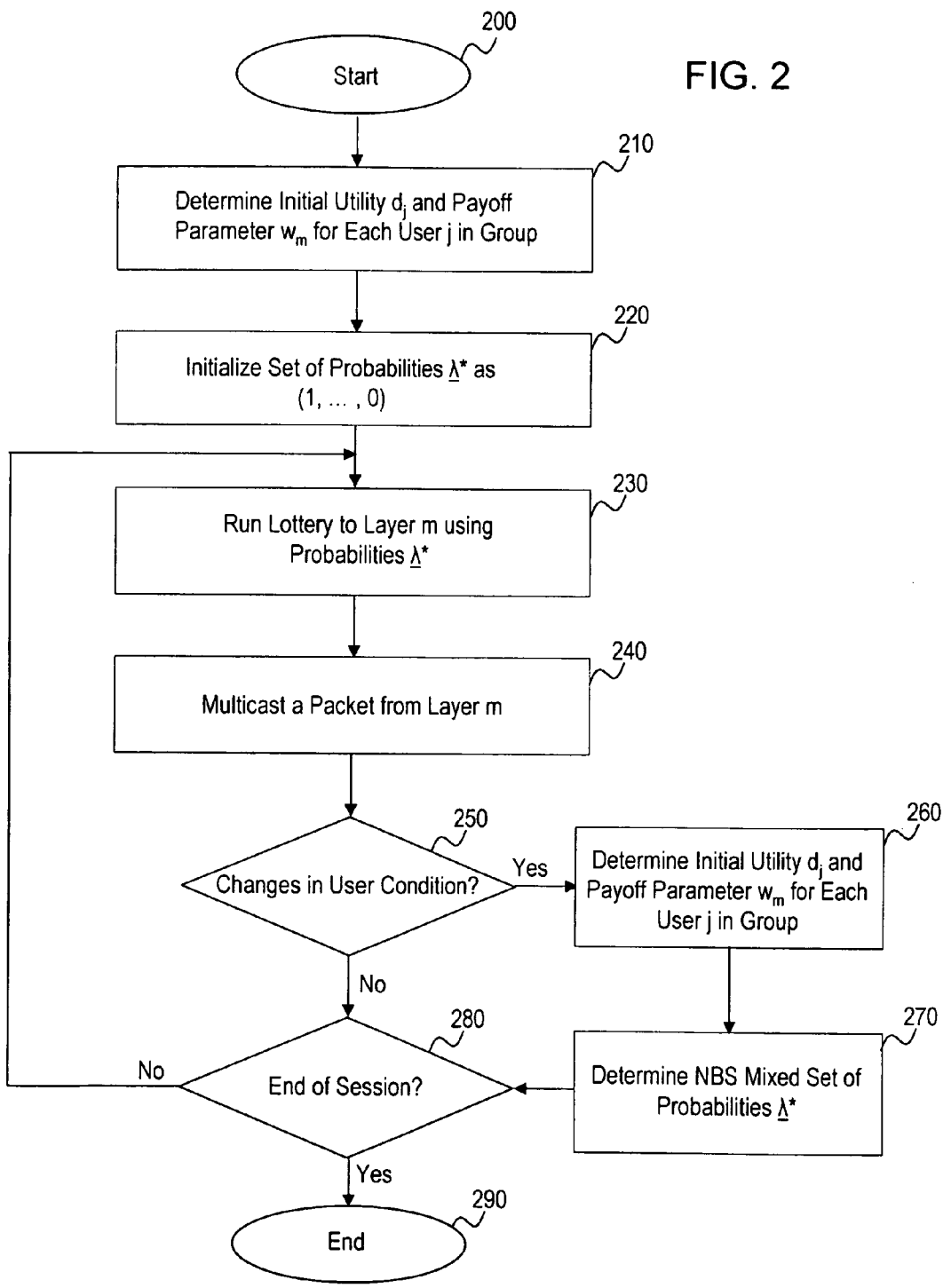
FIG. 2 is a flow chart of selecting an operating point for scalable layered data according to the invention.

FIG. 2 shows the operation flowchart of the inventive operating point selection method for multicasting scalable layered data described above. The invention begins with Block 200, which involves first providing useful data to transmit. Block 210 involves determining the initial utility $d_j$ and payoff parameter $w_m$ for each user j in the group by surveying the users in the group. Block 220 involves determining the initial set probabilities $\underline{\lambda}^*$ which correlate to the lowest layer that can accommodate all the users in the group. Block 230 is the running of the lottery according to the initial set probabilities $\underline{\lambda}^*$. The layer m determined in Block 230 is then multicast as represented by Block 240. Block 250 can represent communication with the users to determine successful receipt of the multicast layer m and/or some change in user conditions. Block 260 involves reevaluating the initial utility $d_j$ and payoff parameter $w_m$ for user j who requests data from a different layer than last time. Block 270 involves determining the probability distribution $\underline{\lambda}^*$ which corresponds to the new sets of initial utilities and payoff parameters of all the users in the group. Block 280 involves determining if the multicast session is finished. If not, the same process repeats starting from Block 230.

For greater understanding of the invention, a simple example of the invention will be provided where there are two users 1, 2 (i.e. N=2) and two layers of data having utility values $u_1$, $u_2$. The two users have initial utility values $d_1$, $d_2$.

Only the layer which one user is requesting has non-zero utility to the user. The multicasting server can find the NBS probabilities distribution vector $\underline{\lambda}^*$ by solving the following optimization problem:

$$\text{Max} \prod_{j=1}^{2} \left( \sum_{m=1}^{2} \lambda_m u_{j,m} - d_j \right) = \max U(\lambda_1, \lambda_2)$$

$$= (u_1 \lambda_1 - d_1)(u_2 \lambda_2 - d_2)$$

such that $\lambda_1 + \lambda_2 = 1$. m corresponds to the number of operating points and j corresponds to the number of users. The probabilities $\lambda_1$ and $\lambda_2$ simplify to $\lambda_1 = 0.5 + 0.5(d_1/u_1 - d_2/u_2)$ and $\lambda_2 = 0.5 + 0.5(d_2/u_2 - d_1/u_1)$.

In the simple example, if $u_1 = w_1$ for a first layer utility, $u_2 = w_2$ for a second layer utility, $w_1 > w_2$, and a user can request layer i (i∈{1,2}), then it follows that $d_i = w_i/\alpha^i$, where $\alpha \geq 1$ and $\alpha \in R$.

When the two users are requesting the same layer i=1, then $\lambda_1 = \lambda_2 = 0.5 + 0.5(w_1/\alpha^1 - w_1/\alpha^1) = 0.5$. When the two users are requesting the same layer i=2, then $\lambda_1 = \lambda_2 = 0.5 + 0.5(w_2/\alpha^2 - w_2/\alpha^2) = 0.5$. In the lottery in this example, there is a 0.5 probability of selecting the initial utility or minimum payoff that user 1 (i.e. $d_1$) wants and a 0.5 probability of selecting the initial utility or minimum payoff that user 2 (i.e. $d_2$) wants. However, because in the example, both users are establishing their initial utility or minimum payoff to be the same layer, the lottery will select the layer (either i=1 or 2) that both users had identified.

When user 1 is requesting the layer 1 and user 2 is requesting the same layer 2, then $\lambda_1 = 0.5 + 0.5((w_1/\alpha^1)/w_1 - (w_2/\alpha^2)/w_2) = 0.5 + 0.5(1/\alpha - 1/\alpha^2)$ and $\lambda_2 = 0.5 + 0.5((w_2/\alpha^2)/w_2 - (w_1/\alpha^1)/w_1) = 0.5 + 0.5(1/\alpha^2 - 1/\alpha)$. With $\alpha \geq 1$, then $1/\alpha \geq 1/\alpha^2$ and $\lambda_1 \geq \lambda_2$. When $\lambda_1$ exceeds $\lambda_2$, user 1 is given the higher preference during the lottery, which is desirable, because user 1 is requesting the more important layer 1.

From the above, the results can be easily extended to other two-user multiple layers scenarios. Suppose the user 1 is requesting a layer that has initial utility function value $d_i = w_i/\alpha^i$ and user 2 is requesting a layer having an initial utility function value $d_j = w_j/\alpha^j$, then $\lambda_1 = 0.5 + 0.5(1/\alpha^i - 1/\alpha^j)$ and $\lambda_2 = 0.5 + 0.5(1/\alpha^j - 1/\alpha^i)$. In one specific example, when user 1 is requesting layer 1, user 2 is requesting layer 2 and α=1.2, then $\lambda_1 = 0.5 + 0.5((w_1/\alpha^1)/w_1 - (w_2/\alpha^2)/w_2) = 0.5 + 0.5(1/\alpha - 1/\alpha^2) = 0.5694$ and $\lambda_2 = 0.5 + 0.5((w_2/\alpha^2)/w_2 - (w_1/\alpha^1)/w_1) = 0.5 + 0.5(1/\alpha^2 - 1/\alpha) = 0.4306$. In another specific example, when user 1 is requesting layer 1, user 2 is requesting layer 2 and α=1.5, then $\lambda_1 = 0.5 + 0.5((w_1/\alpha^1)/w_1 - (w_2/\alpha^2)/w_2) = 0.5 + 0.5(1/\alpha - 1/\alpha^2) = 0.6111$ and $\lambda_2 = 0.5 + 0.5((w_2/\alpha^2)/w_2 - (w_1/\alpha^1)/w_1) = 0.5 + 0.5(1/\alpha^2 - 1/\alpha) = 0.3889$.

b. Application to Multicasting Tiered Services

Tiered services in a multicasting network refer to the services that are prioritized into several groups based on a certain metric assurance. For example, users who subscribe to premium services in a multicast group can get better QoS than those who subscribe basic services. With the invented operating selection strategy, the tiered services can be realized with certain fairness maintained among each group. For a group of users with higher priority assurance, the initial utility $d_j$ for each user j ($1 \leq j \leq N$) in the group can be set to a larger value, or the utility function $U_{j,m}$ ($1 \leq m \leq M$) is set to a smaller value. On the other hand, for a group of users with lower priority assurance, the initial utility $d_j$ for each user j in the group can be chosen to have a smaller value, or the utility function $U_{j,m}(1 \leq m \leq M)$ is set to a larger value.

With the above operation, after solving the probability vector $\lambda^*$, the groups of users with higher priority have larger probability in getting their desired operating points than the groups of users with lower priority.

In one embodiment of the invention the probabilities $\lambda_1$ through $\lambda_4$ used in running the lotteries are within 20% of the values that correspond to the maximum value of the arithmetic product. In other words, it is intended that alternative formalisms which that produce probabilities in the probability vector $\lambda^*$ that are within 20% of the values determined from the Game Theory formulism are considered embodiments of the invention.

The invention claimed is:

1. A method for multicasting data comprising:
   determining a set of minimum utility preferences for each user in a multicast group;
   determining utilities of data for which the users request;
   running a lottery of the minimum utility preferences according to a probability distribution $\lambda=(\lambda_1, \ldots \lambda_M)$ in which M is the number of operating points, wherein probabilities $\lambda_1$ through $\lambda_M$ are those respectively associated with a first operating point $S_1$ through a last operating point $S_M$ and $$\sum_{j=1}^{N} \lambda_m = 1$$

and where the probabilities $\lambda_1$ through $\lambda_M$ represent values which are within 20% of the values that correspond to the maximum value of the arithmetic product $$\prod_{j=1}^{N} \left( \sum_{m=1}^{M} \lambda_m u_{j,m} - d_j \right)$$

wherein $u_{j,m}$ is the utility function of the operating point m for user j and $d_j$ is the minimum utility preference for the user j.

2. The method of claim 1 comprising the step of multicasting data responsive to the step of running the lottery.

3. The method of claim 1 comprising the step of correlating minimum utility preferences to a minimum throughput or quality of service for users brought by the operating point settings.

4. The method of claim 3 comprising the step of multicasting data responsive to the step of running the lottery.

5. The method of claim 1 comprising the step of establishing relative importance of the different data that users request or relative importance of user requests such that the utilities of data correlate to relative importance in the step of determining utilities of data.

6. The method of claim 5 comprising the step of multicasting data responsive to the step of running the lottery.

7. A method for multicasting data comprising:
   determining initial utility and payoff parameter for each user in a group for a lowest layer of data that accommodates all users;
   initializing a probability vector as $(1, \ldots, 0)$;
   running a lottery for the layer using the probability vector to assign the lowest layer;
   multicasting the lowest layer;
   determining new initial utility and corresponding payoff parameter for each remaining user in the group for a plurality of layers of data when there is confirmation at least one user in the group has received the lowest layer;
   determining a mixed set probability vector for the plurality of layers of data;
   running another lottery according to the mixed set probability vector to select a particular layer from the plurality;
   multicasting the particular layer.

* * * * *